(12) United States Patent
Ogawa

(10) Patent No.: US 6,401,031 B2
(45) Date of Patent: Jun. 4, 2002

(54) TRAVEL TIME OBTAINING SYSTEM, LOCAL MAP DATA SERVER, TRAVEL TIME OBTAINING SERVER, CONTROL METHODS THEREOF, AND RECORDING MEDIUM

(76) Inventor: Hideharu Ogawa, 6-18, Osaki 2-chome, Shinagawa-ku, Tokyo (JP), 141-0032

( * ) Notice: Subject to any disclaimer, the term of this patent is extended or adjusted under 35 U.S.C. 154(b) by 0 days.

(21) Appl. No.: 09/789,325

(22) Filed: Feb. 20, 2001

(30) Foreign Application Priority Data

Mar. 20, 2001 (JP) .......................................... 2000-42946

(51) Int. Cl.$^7$ .......................... G01C 21/00; G01C 21/34
(52) U.S. Cl. ...................... 701/202; 701/201; 701/205; 701/204
(58) Field of Search ................................ 701/202, 201, 701/204, 205, 209, 210, 207, 212, 208; 73/178 R

(56) References Cited

U.S. PATENT DOCUMENTS

| | | | | |
|---|---|---|---|---|
| 5,928,308 A | * | 7/1999 | Narba et al. ................. | 701/201 |
| 6,141,751 A | | 10/2000 | Ogawa | |
| 6,144,917 A | * | 11/2000 | Walters et al. ............... | 701/204 |
| 6,282,487 B1 | * | 8/2001 | Shiomi et al. ............... | 701/204 |
| 6,285,950 B1 | * | 9/2001 | Tanimoto ..................... | 701/201 |
| 6,311,124 B1 | * | 10/2001 | Maeda et al. ................ | 701/204 |
| 6,317,685 B1 | * | 11/2001 | Kozak et al. ................ | 701/210 |
| 6,321,158 B1 | * | 11/2001 | Delorme et al. ............. | 701/201 |

FOREIGN PATENT DOCUMENTS

JP            10-307799            11/1998

* cited by examiner

*Primary Examiner*—Richard M. Camby
(74) *Attorney, Agent, or Firm*—Luce, Forward, Hamilton & Scripps LLP

(57) ABSTRACT

A map server 151 transmits information representing travel time between a nearby point and a via point as a response. An ISP 171 transmits information representing travel time between destination and the via point as a response. A travel time obtaining server 161 accepts an enquiry indicating a nearby point and destination from a terminal 111, and selects a ISP 171 on which the destination is registered from a plurality of the ISP 171. The travel time obtaining server 161 obtains information representing a via point and travel time A between the travel-time and the destination from the selected ISP 171, and obtains information representing travel time B between the nearby point and the via point from the map server 151. The travel time obtaining server 161 calculates A+B, and transmits information representing the calculation result to the terminal 111 as a response.

23 Claims, 7 Drawing Sheets

201

| 212 | 213 | | 232 | 233 | 234 | 235 |
|---|---|---|---|---|---|---|
| LOCATION | LOCATION NO. | | NEARBY POINT | VIA POINT | TRAVEL TIME | NOTE |
| ⋮ | ⋮ | | ⋮ | ⋮ | ⋮ | ⋮ |
| LA | 12345 | | 12345 | 67890 | 6 HOURS | TRAIN |
| UNION STA. | 12345 | | 12345 | 67890 | 7 HOURS | CAR |
| ⋮ | ⋮ | | ⋮ | ⋮ | ⋮ | ⋮ |
| LOS ANGELES | 12345 | | | | | |
| UNION STATION | 12345 | | 33333 | 55555 | 25 MIN. | CAR |
| ⋮ | ⋮ | | ⋮ | ⋮ | ⋮ | ⋮ |
| SAN FRANCISCO | 67890 | | 55555 | 33333 | 40 MIN. | CAR |
| ⋮ | ⋮ | | ⋮ | ⋮ | ⋮ | ⋮ |

211

231

DATABASE

*FIG. 2*

WWW BROWSER

URL: http://www.144.ne.jp/map/

USER NAME: USER123

| NO. | VIA POINT | DESTINATION | TRAVEL TIME | NOTE |
|-----|-----------|-------------|-------------|------|
| 1 | LOS ANGELES | ABC GOLF COURSE | 20 MIN. | CAR |
| 2 | SAN FRANCISCO | DEF GOLF COURSE | 30 MIN. | COACH |

VIA POINT

DESTINATION

TRAVEL TIME

NOTE

NEW REGISTRATION

EDIT    ITEM NO.

DELETE    ITEM NO.

*FIG. 5*

TRAVEL TIME OBTAINING SYSTEM, LOCAL MAP DATA SERVER, TRAVEL TIME OBTAINING SERVER, CONTROL METHODS THEREOF, AND RECORDING MEDIUM

BACKGROUND OF THE INVENTION

1. Field of the Invention

The present invention relates to a travel time obtaining system, a local map data server, a travel time obtaining server, control methods thereof, and a recording medium, more particularly, to a travel time obtaining system, a local map data server, a travel time obtaining server, and control methods thereof which are suitable for managing travel time information around destination location or starting location and wide area travel time information separately, and a recording medium storing a program which realizes the above.

2. Description of the Related Art

Routing devices for interconnecting terminal and computer networks such as the Internet have been provided conventionally. Those routing devices include dial-up servers or dial-up routers in a case where interconnection between the terminals and the routing device uses PSTN (Public Switched Telephone Network). In a case where the terminals and the routing device are wired by, for example, Ethernet connection (including wireless connection), those routing devices are called gateway.

It has been known that ISP (Internet Service Provider) is a business entity which provides users of the terminals with the right to use the routing devices of the ISP thus the users are allowed to connect the Internet The computer networks such as the Internet include ASP (Application Service Providers) which provides the users of the terminals with services.

The users connects the Internet via the ISP and receives services from the ASP through a browser for WWW (World Wide Web). The service contents provided by the ASP may be not only image data sound data, and search results, but also map data.

A map data ASP owns a server to manage map data. The server accept requests from the users, and replies to them. The server also stores travel time data of various sections.

Conventionally, the map data ASP manages all sets of the travel time data in order to obtain travel time of a section based on the map data New comers join the ISP business and carry out various R&D activities as they are interested in WWW in these days.

However, since the conventional map data ASP manages all sets of travel time data, the map data providing business has difficulties in providing accurate travel time data That is, travel time varies in accordance with various conditions. For example, if a user requests travel time to a golf course, a famous place, a sightseeing spot, etc., it may take longer or shorter time to get to there than the travel time obtained by the map data ASP, because conditions including a traffic jam, a traffic restriction, etc. depend on seasons, day, or time.

It has been required a system which can manage data corresponding to various conditions at everywhere.

SUMMARY OF THE INVENTION

It is an object to provide a travel time obtaining system, a local map data server, a travel time obtaining server, control methods thereof, and a recording medium storing a program which realizes the above, to overcome the above described problem.

To achieve the above object, the invention will now be disclosed in accordance with the principle of the present invention.

A travel time obtaining system according to a first aspect of the present invention comprises a wide area map data server, and a plurality of local map data servers, a travel time obtaining server, and a terminal, which are being connected to each other via a computer network.

The wide area map data server: accepts an enquiry indicating a nearby point and a via point; and responds to the accepted enquiry by transmitting information representing travel time between the nearby point and the via point if the information is registered on the wide area map data server.

Each of the plurality of the local map data servers: accepts an enquiry indicating destination; and responds to the accepted enquiry by transmitting information representing the via point and travel time between the via point and the destination, if information representing the destination, the via point registered on the wide area map data server, and travel time between the via point and the destination is registered on the local map data server concerned.

The travel time obtaining server: accepts an enquiry indicating a nearby point and destination; selects one of the plurality of the local map data server, on which the destination is registered; transmits an enquiry indicating the destination to the selected local map data server, to obtain information representing a via point and travel time between the via point and the destination; transmits an enquiry indicating the nearby point and the via point to the wide area map data server, to obtain information representing travel time between the nearby point and the via point; and responds to the accepted enquiry by transmitting information representing the sum of the obtained travel times between the nearby point and the via point and between the via point and the destination, as travel time between the nearby point and the destination.

The terminal: transmits an enquiry indicating a nearby point and destination to the travel time obtaining server, and obtains information representing travel time between the nearby point and the destination from the travel time obtaining server.

The travel time obtaining system according the present invention may further comprise a connection authenticator being connected to the computer network, In this case, the connection authenticator may accept a connection request from the terminal, and establishes connection between the terminal and the computer network if the connection authenticator authenticates the terminal which sent the connection request In the travel time obtaining system according to the present invention, any one of the plurality of the local map data servers may act as the connection authenticator.

In this case, the local map data server acting as the connection authenticator may accepts a request for adding information to registration, editing the registration, or deleting the registration, which indicates destination, a via point, and travel time between the destination and via point, from the authenticated terminal, and modify the registration of the destination, the via point, and the travel time between the destination and the via point indicated by the request, by adding information to the registration, editing the registration, or deleting the registration.

In the travel time obtaining server according to the present invention, the connection authenticator may accept an enquiry indicating a starting point and destination from the authenticated terminal. If the starting point, the nearby point registered on the wide area map data server, and travel time between the starting point and the nearby point are registered on the connection authenticator, the connection authenticator may trasmit an enquiry indicating the nearby point and the destination to the travel time obtaining server, to obtain travel time between the nearby point and the destination, and respond to the accepted enquiry by transmitting information representing the sum of the registered travel time between the starting point and the nearby point and the obtained travel time between the nearby point and the destination, as travel time between the stating point and the destination.

In the travel time obtaining system according to the present invention, the connection authenticator may further transmit information representing the registered travel time between the starting point and the nearby point to the travel time obtaining server, and ask the travel time obtaining server to calculate the sum of the registered travel time between the starting point and the nearby point and the obtained travel time between the nearby point and the destination, and to respond to the terminal by transmitting information representing the sum of the travel times as travel time between the starting point and the destination to the terminal.

In the travel time obtaining system according to the present invention, the connection authenticator may comprise a user name receiver, an authentication character string generator/transmitter, a password string receiver, and a rule memory.

The user name receiver receives information representing a user name from the terminal.

The authentication character string generator/transmitter generates an authentication character string, and transmits information representing the authentication character string to the terminal.

The password string receiver receives information representing a password string from the terminal.

The rule memory stores rules for generating password strings based on the authentication character strings so that the rules are associated with the user names.

The terminal is authenticated when the password string received by the password string receiver is successfully generated based on the authentication character string generated by the authentication character string generator in accordance with the rule corresponding to the user name received by the user name receiver being stored in the rule memory.

A local map data server according to a second aspect of the present invention, is connected to a wide area map data server on which via points are registered and to a travel time obtaining server via a computer network, comprises a local map data register, a destination acceptor, and an information responder.

The local map data register stores information representing destination, a via point registered on the wide area map data server, and travel time between the via point and the destination which are associated with each other.

The destination acceptor accepts an enquiry designating destination; and

The information responder responds to the accepted enquiry, if the destination is registered on the local map data register, by transmitting information representing the via point and travel time corresponding to the registered destination.

The local map data server according to the present invention may further connected to a terminal, and comprise a connection request acceptor and a communication establisher.

The connection request acceptor accepts a correction request from the terminal.

The communication establisher establishes connection between the terminal and the computer network when the terminal which transmits the connection request is authenticated.

The local map data server according to the present invention may further comprise a modification request acceptor and a registration modifier.

The modification request acceptor accepts a request for modifying registration indicating destination, a via point, and travel time between the destination and the via point by adding information to the registration, editing the registration, or deleting the registration.

The registration modifier modifies the registration of the destination, the via point, and the travel time between the destination and the via point indicated by the request, by adding information to the registration, editing the registration, or deleting the registration.

The local map data server according to the present invention may further comprise a user name receiver, an authentication character string generator/transmitter, a password string receiver, and a rule memory.

The user name receiver receives information representing a user name from the terminal.

The authentication character string generator/transmitter generates an authentication character string and transmits information representing the generated authentication character string to the terminal.

The password string receiver receives information representing a password string from the terminal.

The rule memory stores rules for generating password strings based on the authentication character strings so that the rules are associated with the user names.

The terminal is authenticated when the password string received by the password string receiver is successfully generated based on the authentication character string generated by the authentication character string generator in accordance with the rule corresponding to the user name received by the user name receiver being stored in the rule memory.

A travel time obtaining server according to a third aspect of the present invention is connected to a wide area map data server, a plurality of local map data server, and a terminal via a computer network, comprises an enquiry acceptor, a selector, a local map data obtainer, a wide area map data obtainer, and a calculator/responder.

The enquiry acceptor accepts an enquiry indicating a nearby point and destination.

The selector selects a local map data servers on which the destination is registered from the plurality of the local map data servers.

The local map data obtainer transmits an enquiry indicating the destination to the selected local map data server to obtain information representing a via point and travel time between the via point and the destination.

The wide area map data obtainer transmits an enquiry indicating the nearby point and the via point to the wide area map data server to obtain information representing travel time between the nearby point and the via point The calculator/responder calculates the sum of the obtained travel time between the nearby point and the via point and the travel time between the via point and the destination, and responds to the enquiry accepted by the enquiry acceptor by transmitting information representing the sum as travel time between the nearby point and the destination to the terminal.

A method according to a fourth aspect of the present invention controls a local map data server which is connected to a wide area map data server on which via points are registered and a travel time obtaining server via a computer network, which comprises a local map data register which stores information representing destination, a via point registered on the wide area map data server, travel time between the via point and the destination which are associated with each other, comprises the steps of
accepting an enquiry indicating destination; and
if the destination is registered on the local map data register, responding to the enquiry by transmitting information representing a via point and travel time corresponding to the registered destination.

The method of controlling the local map data server according to the present invention may further comprise the steps of: accepting a connection request from a terminal; and if the terminal which send the connection request is authenticated, establishing connection between the terminal and the computer network.

The method of controlling the local map data server according to the present invention may further comprise the steps of: accepting a request for modifying registration by adding the information, editing the registration, or deleting the registration with indicating destination, a via point, and travel time between the destination and the via point, from the authenticated terminal; and modifying the registration of the destination, the via point, and travel time between the destination and the via point indicated by the request, by adding information to the registration, editing the registration, or deleting the registration.

In the method of controlling the local map data server according to the present invention, the local map data server may further comprise a rule memory which stores rules for generating a password string based on an authentication character string so that the rules are associated with user names respectively.

In this case the method may further comprise the steps of receiving information representing the user name from the terminal; generating the authentication character string, and transmitting information representing the generated authentication character string; and receiving information representing the password string from the terminal.

The terminal is authenticated when the password string received at the password string receiving step is successfully generated based on the authentication character string generated by the authentication character string generating step in accordance with the rule corresponding to the user name received by the user name receiving step being stored in the rule memory.

A method according to a fifth aspect of the present invention controls a travel time obtaining server which is connected to a wide area map data server, a plurality of local map data servers, and a terminal via a computer network.

The method comprises the steps of accepting an enquiry indicating a nearby point and destination from the terminal; selecting a local map data server on which the destination is registered from the plurality of the local map data servers; transmitting an enquiry indicating the destination to the selected local map data server to obtain information representing a via point and travel time between the via point and the destination; and responding to the enquiry accepted at the enquiry accepting step by transmitting information representing the sum of the obtained travel time between the nearby point and the via point and travel time between the via point and the destination, to the terminal as information representing travel time between the nearby point and the destination.

A program which controls a computer connected to a computer network, to function as the local map data server or the travel time obtaining server according to the present invention may be stored in a computer readable recording medium such as a compact disc, a floppy disk, a hard disk, a magneto-optical disk, a digital versatile disc, a magnetic tape, and a semiconductor memory.

When a CPU (Central Processing Unit), other devices or peripheral devices of the computer execute(s) the program stored in the recording medium according to the present invention, the computer functions as the local map data server or the travel time obtaining server according to the present invention.

The recording medium storing the program according to the present invention may be distributed or merchandized without bundling in the computer. Or, the program stored in the recording medium may be distributed via a computer network, and the distributed program may be stored on other recording medium.

BRIEF DESCRIPTION OF THE DRAWINGS

These objects and other objects and advantages of the present invention will become more apparent upon reading of the following detailed description and the accompanying drawings in which:

FIG. 2 is a diagram for explaining wide area map data registered in a database of a map server.

FIG. 5 is a diagram showing a registry update form displayed on a terminal's monitor;

DETAILED DESCRIPTION OF THE PREFERRED EMBODIMENTS

Embodiments of the present invention will now be described. The following embodiments are just described for explaining the present invention. The embodiments do not limit the scope of the invention. The scope of the present invention includes various embodiments after arranging some or all elements of the present invention by those skilled in the art.

A case where TCP/IP protocol is employed in telecommunication will be described in the following embodiments. Under TCP/IP protocol, an acknowledge message saying that messages have been arrived is sent to a message sender. In the following embodiments, explanation or description regarding to the acknowledge message transmission under TCP/IP protocol will be omitted for comprehensive explanation

First Embodiment

Figure 1:
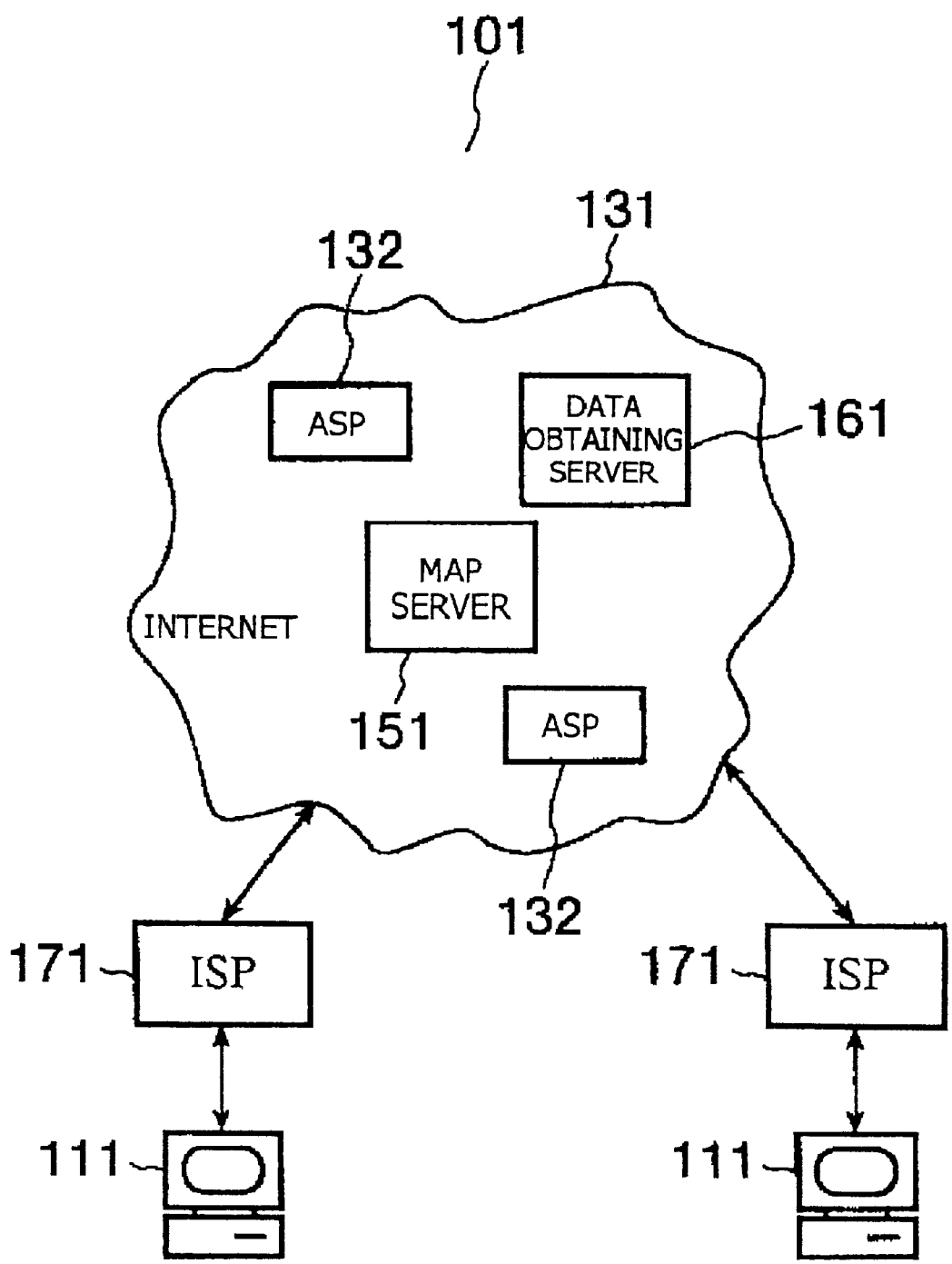
FIG. 1 is a schematic diagram showing the essential structure of the travel time obtaining system according to the present invention.

FIG. 1 is a schematic diagram showing the essential structure of a travel time obtaining system according to the present invention. A first embodiment will now be describe with reference to FIG. 1.

Each user operates a terminal 111 to access the Internet 131. The Internet 131 includes various ASP 132, a map server 151 which manages wide area travel time, and a data obtaining server 161 which obtains travel time data ISP 171 interconnect the ASP 132 etc. and the terminals 111 and transmit messages between them. Message transmission is carried out in accordance with TCP/IP protocol.

Each user operates the terminal 111 to transmits user name and password to the ISP 171. The ISP authenticates the user based on the user name and password. If the authentication is successful, the ISP 171 assigns an ID tag including IP address and port No. to the terminal 111 of the authenticated user, and interconnects the terminal 111 and the Internet 131.

The Internet 131 acts as the computer network of the present invention, the map server 151 acts as the wide area map data server of the present invention, the data obtaining server 161 acts as the travel time data obtaining server, and the ISP 171 acts as the local map data server of the present invention.

A single data processor may include functions of the ASP 132, the map server 151, the data obtaining server 161, and the ISP 171. In other words, the single data processor may provide services by those servers and the providers.

Details of the map server 151 will now be described with reference to FIG. 2. FIG. 2 is a diagram schematically showing wide area map data (including location data and travel time data between 2 locations) registered in a database of the map server 151.

A database 201 in the map server 151 holds a table 211 which has a location column 212 and a location No. column. The location column 212 shows information of typical locations. The typical locations may be intersections on the major streets in states, cities, and villages, ramps or interchanges of the highways, railway stations, and the like.

For example, location No. "12345" is assigned to "Los Angeles" as shown in FIG. 2. The same location No. is assigned an abbreviation "LA" for "Los Angeles".

The same location No. is also assigned to "Union Station" which is a capital railway to station in Los Angeles. In the same manner, location No. "67890" is assigned to "San Francisco".

Another table 231 in the database 201 has location No. columns 232 and 233 which stores location Nos. corresponding to the location data, a travel time column 234 which stores data representing travel time between a set of locations over the location No columns 232 and 233, and a note information column 235 which stores information representing additional notes.

According to the table 231 shown in FIG. 2, it takes 7 hours from location No. "12345" to location No. "67890" by car, while it takes 6 hours by train.

The location No. column 232 in the table 231 stores location Nos. of locations nearby desired starting points (hereinafter, referred to as "nearby point"), while the location No. column 233 stores location Nos. of locations nearby desired final destinations (hereinafter, referred to as "Via point").

In a case where only one way of a highway is opened, for example, travel time from a point A to a point B may differs from travel time from the point B to the point A. According to FIG. 2, it takes 25 minutes to go location "No. 33333" from location "No. 55555" by car, while it takes 40 minutes to go location "No. 55555" from location "No. 33333" by car.

Figure 3:
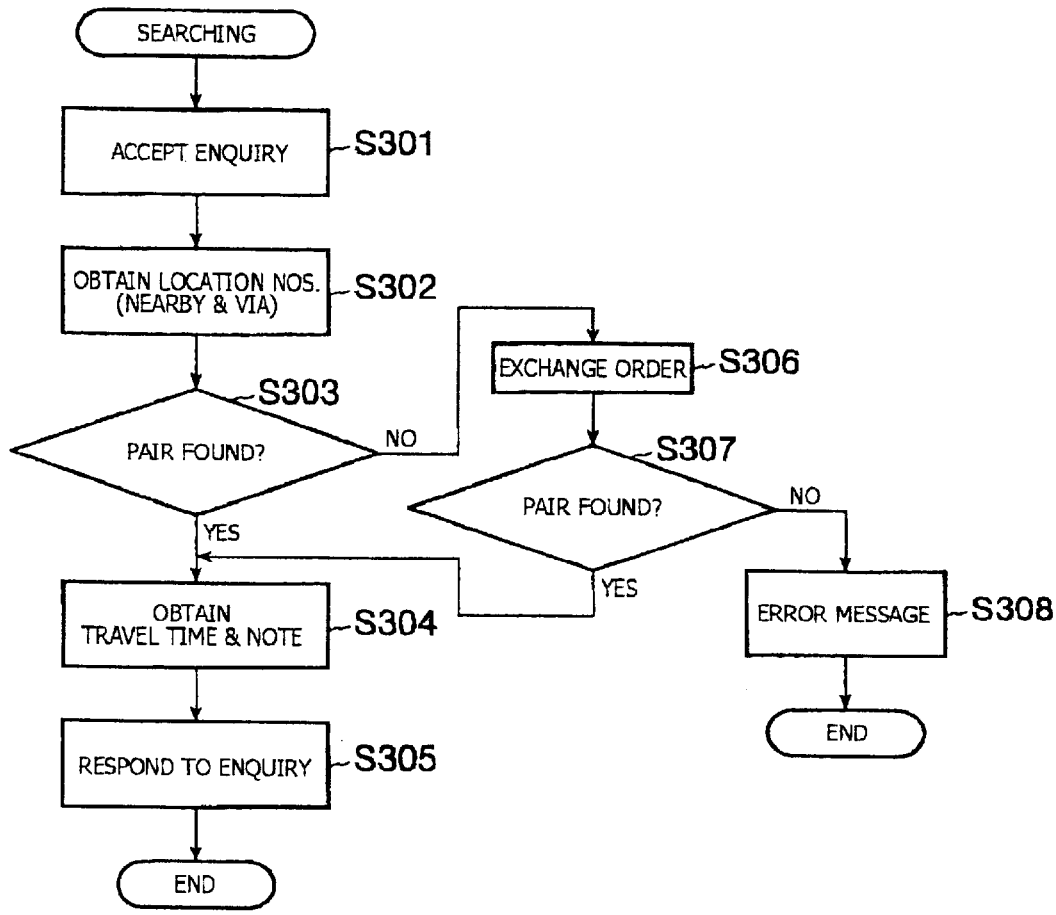
FIG. 3 is a flowchart for explaining search process carried out by the map server.

Search operation carried out by the map server 151 will now be described with reference to FIG. 3 which is a flowchart for explaining the process flow of the search operation.

The map sever 151 accepts a request via the Internet 131 (step S301). In this case, the request designates a nearby point and a via point.

In response to the request reception, the map server 151 accesses the table 211 of the database 201 to obtain location Nos. of the nearby point and the via point (step S302).

Then, the map server 151 accesses the table 231 of the database 201 to search for a pair of location Nos. of the nearby point and the via point (step S303).

If the pair is found (step S303: Yes), the map server 151 obtains travel time data and additional note data corresponding to the found pair from the table 231 (step S304), and sends it to the Internet 131 (the request sender via the Internet 131) as response (step S305), and the process is terminated.

On the contrary, if the pair is not found (step S303: No), the map server 151 exchanges the location Nos. of the nearby point and the via point (step S306), and accesses the table 231 to search for a pair of the location Nos. in exchanged order (step S307). This search method after exchanging the location Nos. helpful for saving the storage because the table 231 requires one set of travel time data if travel time for go equals to travel time for return.

If the pair of the exchanged location Nos. is found (step S307: Yes), the flow forwards to step S304.

On the contrary, if the pair is not found (step S307: No), the map server 151 sends an error report (step S308) as response, and the process is terminated Instead of the error report, the map server 151 may designate extremely long time such as infinite.

If a plurality of pairs are found at step S304 (for example, a case of the same route but plural traffic means, or a case of various routes), all pairs may be sent to the Internet 131 as response, or some highly ranked pairs in the rating of the shortest travel time may be sent to the Internet 131 as response.

Details of the ISP 171 will now be described. The ISP 171 interconnects the terminal 111 and the Internet 131. The ISP 171 may contract with facilities such as a golf course for allowing the administrator of the golf course to register information of the golf course on the ISP 171 via the terminal 111. In this case, the information to be registered on the ISP 171 may represent travel time from the via points to the golf course, thus, the users are able to designate the golf course as the final destination to obtain the travel time.

Figure 4:
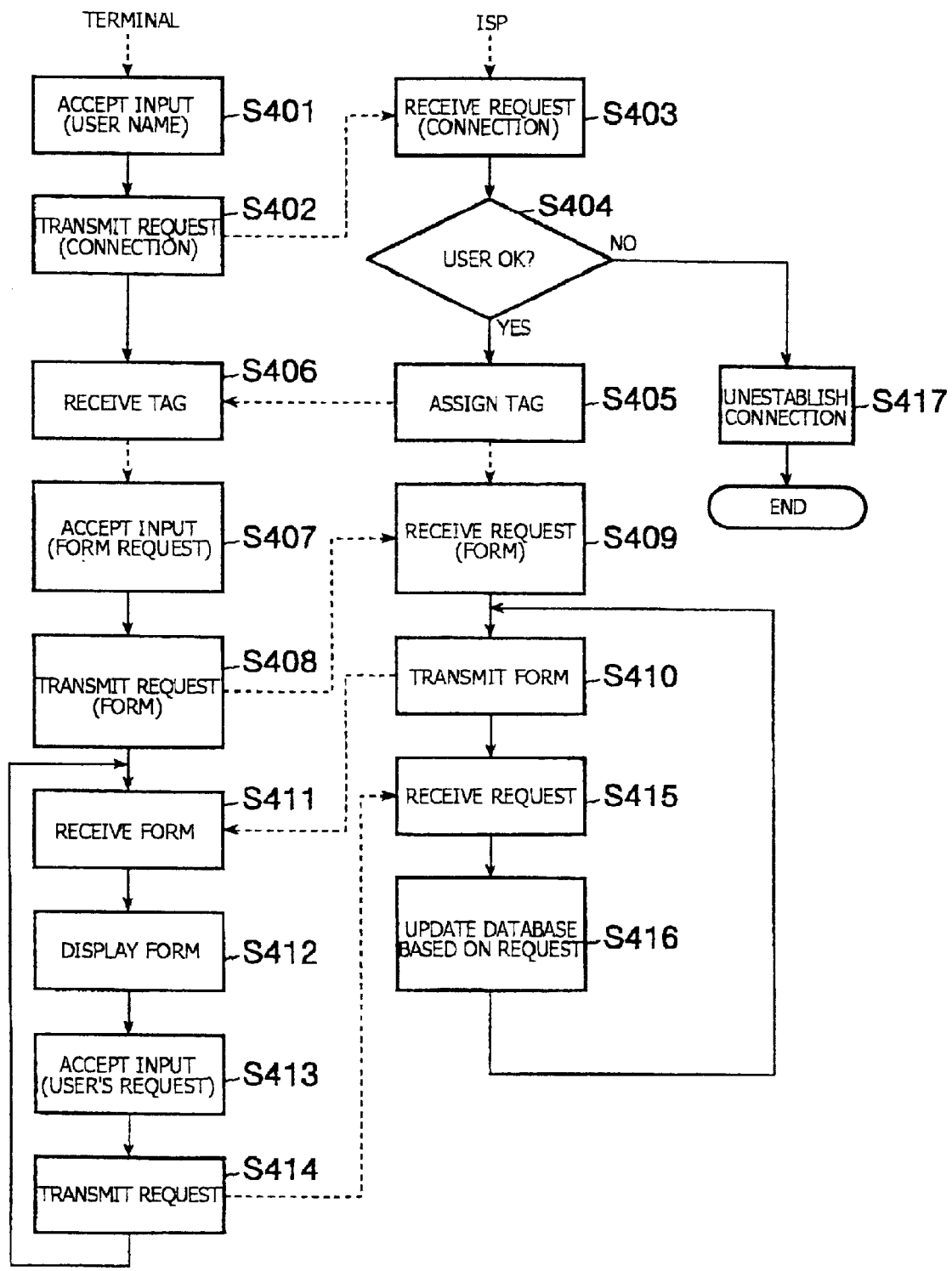
FIG. 4 is a flowchart for explaining data update process in an ISP while showing the process flow in a terminal.

FIG. 4 is a flowchart for explaining registration update processing by which the users are allowed to register local map information (via point, final destination, travel time) on the ISP 171 through the terminals 111 or update the registered local map to information.

The terminal 111 accepts inputs by a user (for example, a manager of the golf course), that is, accepts user name, password, etc. (step S401). The terminal 111 sends a connection request which includes the input information, to the ISP 171 (step S402).

The ISP 171 receives the connection request (step S403), and determines whether the user accessing thereto is authenticated one or not based on the user information included in the connection request (step S404). If the user concerned is authenticated one (step S404: Yes), the ISP 171 assigns an ID tag to the terminal 111 concerned (step S405). The ID tag includes a set of "IP address and port No.".

The ISP 171 also sends a "cookie" file to the terminal 111, thus the terminal 111 is able to send data to the ISP 171 as response. In this case, the ISP 171 is able to manage the user information carefully based on the cookie information during sessions between the terminal 111 and the Internet 131.

The terminal 111 receives the assigned ID tag (step S406), thus, the terminal 111 is allowed to establish sessions with not only the ISP 171 but also various data processors on the Internet 131 such as the ASP 132 via the ISP 171. Since sessions established by the ISP 171 may be based on known techniques, detailed description is omitted here.

The user is allowed to register a set of information including via point, final destination, travel time, and additional note on the ISP 171. Since the method of this registration is the same as that for registering information on the map server 151 described above, detailed description is omitted here. Note that faster operation is available on a travel time obtaining server if location Nos. of the via points art the same as those registered on the map server 151. Instead of location Nos., the user may register location name on the ISP 171, because the number of information sets to be registered on the ISP 171 is quite smaller than those registered on the map server 151.

The terminal 111 accepts user's inputs of a request for sending a form page for updating the registered information (step 9407), the terminal 11 transmits the request to the ISP 171 (step S408). The ISP 171 receives the request from the terminal 111 (step S409), and transmits data representing the form page to the terminal 111 (step S410). The terminal 111 receives the data (step S411), and displays the form page in accordance with the received data (step S412).

As shown in FIG. 5, the registration update form lists several sets of registered via point, final destination, and note, corresponding to the user name "USR123". The user can register additional sets, edit the registered data, or delete the registered data through edit area on the form page. The form page shown in FIG. 5 also indicates URL (Uniform Resource Locator) input as the request for transmitting the form page.

In this embodiment, operations for updating the registered data depend on which button is clicked by an input device such as a mouse.

If the user carries out operation(s) for adding, editing and/or deleting through the form page (step S413), the terminal 111 sends a request signal regarding to the operation(s) to the ISP 171 (step S414). The ISP 171 receives the request signal from the terminal 111 (step S415), and updates the database (step S416). The ISP 171 sends the updated information to the terminal 111 concerned as response, so that updated information is displayed thereon for user's confirmation.

On the contrary, if an unauthenticated user accesses the ISP 171 (step S404: No), the ISP 171 terminates the session with the terminal 111 (step S417), and terminates the processing.

In this embodiment, the above operations are carried out through the WWW browser. Operations in the ISP 171 depend on typical techniques using CGI (Common Gateway Interface) script, Servlets, or the like. According to this structure, the user can operate several tasks simultaneously.

Thus registered local map information is also searchable as well as the wide area map information. Additionally, a user can send enquiry which indicating only the final destination to the ISP 171. In this case, the ISP 171 may send information indicating a via point (registered on the map server 151) and travel time between the final destination and the via point as response. Such the search may be carried out by the technique employed by the aforementioned map server 151, or known typical database techniques.

The ISP 171 may send plural sets of the via points and travel time as response, as well as the case where the map server 151 sends data as response.

Figure 6:
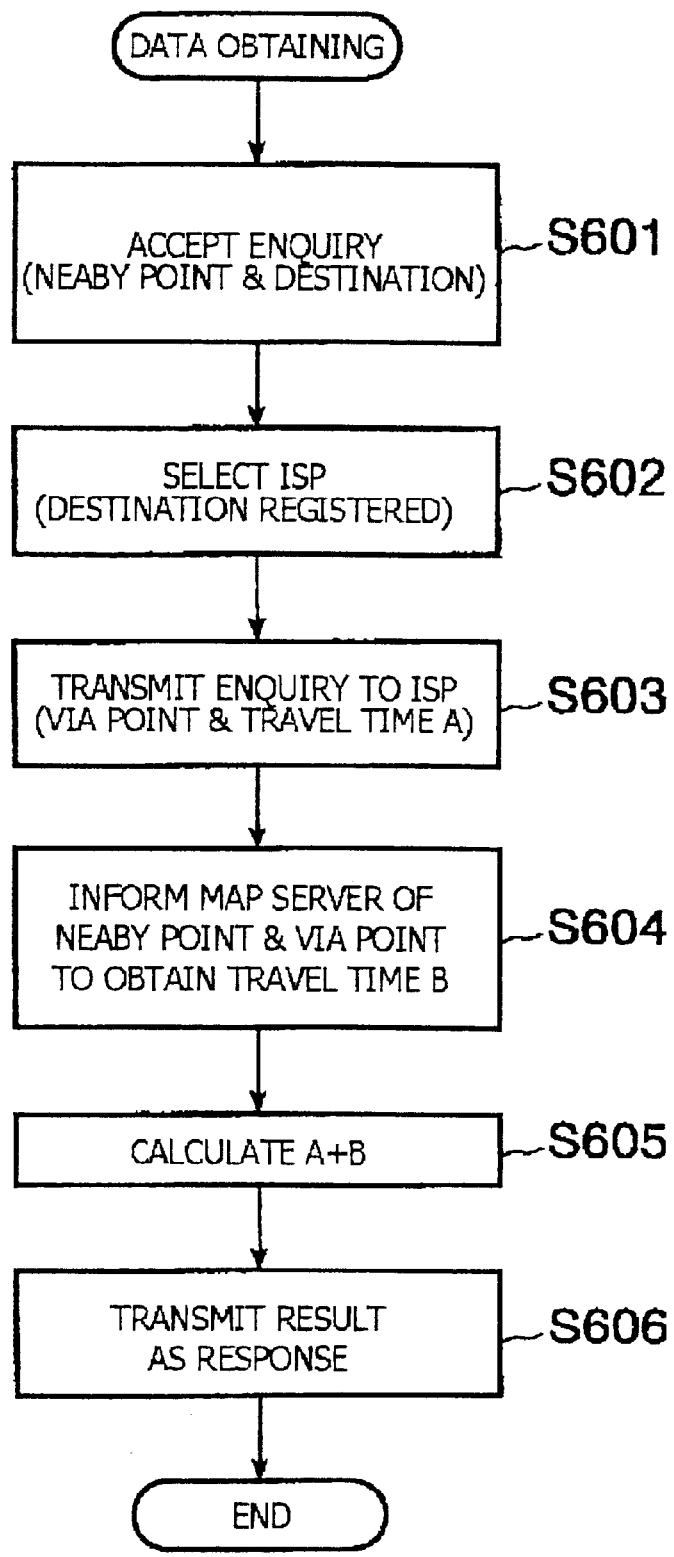
FIG. 6 is a flowchart for explaining data obtaining process carried out by a data obtaining server.

An operation by a travel time data obtaining server (hereinafter, referred to as data obtaining server) 161 will now be described with reference to FIG. 6 which is a flowchart for explaining data obtaining process.

The data obtaining server 161 receives an enquiry signal designating nearby points and via points from various data processors on the Internet 131 (such as the terminals 111, ISP 171, ASP 132) (step S601).

The data obtaining server 161 selects the ISP 171 on which the desired destination is registered, based on pre-collected information or by enquiring the registered ISP 171.

Known techniques regarding to WWW search robot may be applicable to pre-collecting information.

The data obtaining server 161 obtains information of via point corresponding to the destination, and travel time (A) between the departure and the via point (step 3603).

Then, the data obtaining server 161 sends an enquiry signal indicating the via point obtained at step S603 and the nearby point received at step S601, to the map server 151, and obtains information representing travel time (B) between those points (step S604).

The data obtaining sever 161 calculates the sum of the travel time (A) obtained at step S603 and the travel time (B) obtained at step S604 (step S605), and sends information representing the calculated travel time to the enquiry sender as response (step S606), and the processing is terminated.

If plural via points are obtained at step S603, the data obtaining server 161 sends enquiry signals corresponding to the obtained via points respectively to the map server 151. If the map server 151 sends plural sets of travel time, the data obtaining server 161 calculates the sums of the travel times respectively at step 605. The data obtaining server 161 may send all of thus obtained plural sets of travel time as response at step S606, or send some highly ranked sets in the rating of shortest travel time.

In addition to the travel time data, the note information obtained at step S604 may be sent as response at step S606.

Each of the wide map data server, the local map data server, and the travel time data obtaining server may be a computer having a network interface card, a modem, or a terminal adapter, thus being allowed to establish connection to the Internet via Ethernet, ISDN, or ADSL. In this case, data in the wide map data server may be stored in an external storage device such as a hard disk, or a recording medium such as CD-ROM (Compact Disc Read Only Memory).

Second Embodiment

According to the first embodiment, a user can obtain travel time between the nearby point registered on the map server 151 and the final destination registered on the ISP 171. The second embodiment discloses a technique to obtain travel time sets of starting point to a via point, a nearby point to a via point, and a via point to final destination The second embodiment features that a user previously registers travel time from a starting point (for example, the user's home) to a nearby point on the ISP 171.

More precisely, each user registers travel time between the starting point and the nearby point registered on the map server 151, on the ISP 171 in the same manner as described in the first embodiment.

When the data obtaining server 161 receives an enquiry signal designating the stating point and final destination, the data obtaining server 161 divides the route in three sections as follows.

(1) Starting Point to Nearby Point
(2) Nearby Point to Via Point
(3) Via Point to Final Destination To obtain travel time data of section (1), the data obtaining server 161 selects the ISP 171 which has information of the starting point as "destination". The data obtaining server 161 may carry out the same processing with using obtained via point information as nearby point information.

In the same manner as described in the first embodiment travel time data of section (2) is obtained from the map server 151. The data obtaining server 161 selects the ISP 171 which manages information of the final destination, and obtains travel time data of the section (3) from the selected ISP 171.

Finally, the data obtaining server 161 calculates the sum of the travel times of the sections (1) to (3), and sends information representing the summed travel time as response to the request for travel time from the starting point to the final destination.

In a case where the registered starting point is the user's home or office, it might be undesirable that such the information is exposed to the public through the internet 131. In this case, the user may transmit information representing only a nearby point and travel time between the starting point and the nearby point to the data obtaining server 161, thus, the searching for travel time data of section (1) is omitted This method prevents the information representing the starting point from being exposed to the public through the Internet 131, thus, the user's personal information is prevented from leaking.

Modified Embodiment

Figure 7:
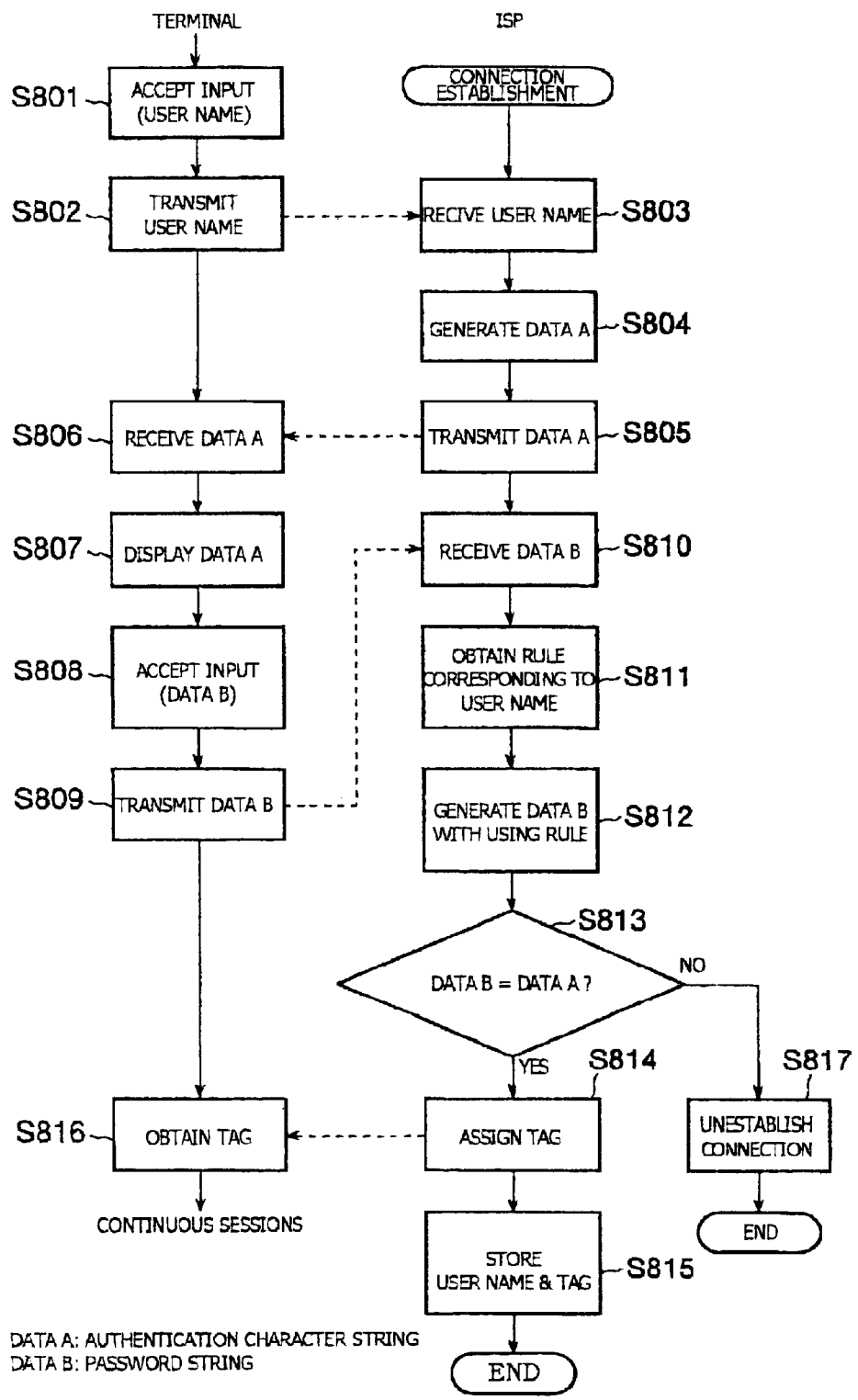
FIG. 7 is a flowchart for explaining process for establishing connection by the ISP while showing the process flow in the terminal.

Connection establishing procedure for establishing connection between the terminal 111 and the ISP 171 will now be described with reference to FIG. 7 which is a flowchart for explaining steps of the procedure. This processing may be employed in the above described embodiments as steps S401 to S404.

The terminal 111 accepts user name input by the user (step S801), and transmits a connection request to the ISP 171 together with the information representing the user name (step S802).

The ISP 171 receives the connection request (step S803) from the terminal 111. The ISP 171 generates an authentication character string with using random numbers (step S804). The ISP 171 transmits the authentication character string to the terminal 111 (step S805).

The terminal 111 receives the authentication character string (step S806), and displays it on the monitor (step S807).

The user converts the displayed authentication character string into a password character string in accordance with the predetermined rule which have been noticed to the user previously. The data representing the rule is stored on the hard disk of the ISP 171 while each rule is associated with corresponding user name. Details of the conversion will be described later.

The terminal 111 accepts input of the password character string by the user (step S808), and transmits the password string to the ISP 171 (step S809).

The ISP 171 receives the password string (step S810).

The ISP 171 accesses its hard disk to obtain the rule associated with the user name concerned (step S811). The ISP 171 applies the obtained rule to the authentication character string generated at step S804 to convert the authentication character string (step S812).

The ISP 171 compares the password character string received at step S810 with the converted character string generated at the step S812, to determined whether those are equal to each other or not (step S813).

In case of equal (step S813: Yes), the ISP 171 determines that the received connection request is authenticated one. Then, the ISP 171 assigns an ID tag being unused to the terminal 111 concerned (step S814). The ISP 171 stores the assigned D tag on the hard disk or RAM (Random Access Memory) so that the ID tag is associated with the user name concerned (step S815), and the processing is terminated.

The terminal 111 obtains the assigned ID tag (step S816) and use it for following communication procedures.

On the contrary, in case of unequal (step S813: No), that is, the received connection request is unauthenticated one, the ISP 171 sends the terminal 111 a notice saying access inhibited (step S817), and the processing is terminated. Process to respond to the notice by the terminal 111 is not shown in FIG. 7 for simplification.

Examples of applicable rules according to this embodiment will now be described.

The authentication character string represents n-digit numerical characters while the password string represents m-digit numerical characters. It is established an individual rule for each user, by which predetermined digits in the password string is obtained by carrying out predetermined calculation based on predetermined digits in the authentication character string. For example, it is ruled that applying predetermined calculation (such as addition, subtraction, multiplication and division) to a numeric character on $h_k$-th digit ($1 \leq h_k \leq n$) in the authentication character string to obtain a numeric character on k-th digit ($1 \leq k \leq m$) in the password string. Assigning individual sets of digit No. $h_k$ and calculation process to each user realizes the secure user recognition.

For example, a rule "obtain: solution after adding 1 to 2nd digit, solution after adding 2 to 4th digit, and solution after adding 3 to 6th digit" is given to a user, while another rule "obtain: solution after multiplying 1 st digit by 3, quotient after dividing 8th digit by 4, solution after subtracting 3 from 5th digit" is given to the other user, where n=8 and m=3 (in case of two or more digits result, obtain the first digit). According to the former rule, if the authentication character string represents "18245924", "962" is obtained as the password string.

The authentication character string may include alphanumeric characters. In this case, applicable commands for calculation may be "obtain following character", "obtain previous character" "convert t into a small letter", "convert it into a capital letter", "obtain its vowel", etc. Or, a predetermined conversion table as disclosed in Unexamined Japanese Patent Application KOKAI Publication No. H10-307799 and U.S. Pat. No. 6,141,751 may be applicable to this embodiment.

The above described method prevents raw data representing password from being input through the terminal 111.

This is helpful for providing the system for accessing the Internet 131 with improved security. Especially, it is effective in protecting the system from viruses which steal passwords with monitoring dial-up connections, because the key to successful authentication depends on the user's individual rule.

According to the present invention as described above, it is able to provide a travel time obtaining system, a local map data server, a travel time obtaining server, and controlling methods thereof which are suitable for separately managing information representing travel times around destination or starting point and information representing travel time across wide area.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2000-42946 filed on Feb. 21, 2000 and including specification, claims, drawings and summary. The disclosure of the above Japanese Patent Application is incorporated herein by reference in its entirety.

What is claimed is:

1. A travel time obtaining system comprising a wide area map data server, and a plurality of local map data servers, a travel time obtaining server, and a terminal, which are being connected to each other via a computer network, wherein,
   (a) said wide area map data server: accepts an enquiry indicating a nearby point and a via point; and
      responds to said accepted enquiry by transmitting information representing travel time between said nearby point and said via point if the information is registered on said wide area map data server,
   (b) each of said plurality of said local map data servers: accepts an enquiry indicating destination; and
      responds to said accepted enquiry by transmitting information representing said via point and travel time between said via point and said destination, if information representing said destination, said via point registered on said wide area map data server, and travel time between said via point and said destination is registered on said local map data server concerned,
   (c) said travel time obtaining server: accepts an enquiry indicating a nearby point and destination;
      selects one of said plurality of the local map data server, on which said destination is registered;
      transmits an enquiry indicating said destination to said selected local map data server, to obtain information representing a via point and travel time between said via point and said destination;
      transmits an enquiry indicating said nearby point and said via point to said wide area map data server, to obtain information representing travel time between said nearby point and said via point; and
      responds to said accepted enquiry by transmitting information representing the sum of the obtained travel times between said nearby point and said via point and between said via point and said destination, as travel time between said nearby point and said destination, and
   (d) said terminal:
      transmits an enquiry indicating a nearby point and destination to said travel time obtaining server, and obtains information representing travel time between said nearby point and said destination from said travel time obtaining server.

2. The travel time obtaining system according to claim 1 further comprising a connection authenticator being connected to said computer network,
   (e) said connection authenticator accepts a connection request from said terminal, and establishes connection between said terminal and said computer network if said connection authenticator authenticates said terminal which sent the connection request.

3. The travel time obtaining system according to claim 2, wherein any one of said plurality of the local map data servers acts as said connection authenticator,
   said local map data server acting as said connection authenticator:
      accepts a request for adding information to registration, editing the registration, or deleting the registration, which indicates destination, a via point, and travel time between said destination and via point, from said authenticated terminal; and
      modifies the registration of said destination, said via point, and the travel time between said destination and said via point indicated by said request, by adding information to the registration, editing the registration, or deleting the registration.

4. The travel time obtaining system according to claim 2, wherein
   said connection authenticator accepts an enquiry indicating a flaring point and destination from said authenticated terminal and
   if said starting point, the nearby point registered on said wide area map data server,
   and travel time between said starting point and said nearby point are registered on said connection authenticator, said connection authenticator:
      transmits an enquiry indicating said nearby point and said destination to said travel time obtaining server, to obtain travel time between said nearby point and said destination; and
      responds to said accepted enquiry by transmitting information representing the sum of said registered travel time between the starting point and the nearby point and said obtained travel time between the nearby point and the destination, as travel time between said starting point and said destination.

5. The travel time obtaining system according to claim 4, wherein
   said connection authenticator further transmits information representing said registered travel time between said starting point and said nearby point, to said travel time obtaining server, and
   asks said travel time obtaining server to calculate the sum of said registered travel time between the starting point and the nearby point and said obtained travel time between the nearby point and the destination, and to respond to said terminal by transmitting information representing the sum of the travel times as travel time between said starting point and said destination to said terminal.

6. The travel time obtaining system according to claim 2, wherein said connection authenticator comprises:
   a user name receiver which receives information representing a user name from said terminal;

an authentication character string generator/transmitter which generates an authentication character string, and transmits information representing said authentication character string to said terminal;

a password string receiver which receives information representing a password string from said terminal; and a rule memory which stores rules for generating password strings based on the authentication character strings so that the rules are associated with the user names, and said terminal is authenticated when the password string received by said password string receiver is successfully generated based on the authentication character string generated by said authentication character string generator in accordance with the rule corresponding to the user name received by said user name receiver being stored in said rule memory.

7. A local map data server connected to a wide area map data server on which via points are registered and to a travel time obtaining server via a computer network, comprising:

a local map data register which stores information representing destination, a via by point registered on said wide area map data server, and travel time between said via point and said destination which are associated with each other, a destination acceptor which accepts an enquiry designating destination; and an information responder which responds to said accepted enquiry, if said destination is registered on said local map data register, by transmitting information representing the via point and travel time corresponding to said registered destination.

8. The local map data server according to claim 7 further comprising:

a connection request acceptor which accepts a correction request from said terminal; and a communication establisher which establishes connection between said terminal and said computer network when said terminal which transmits said connection request is authenticated.

9. The local map data server according to claim 8 further comprising:

a modification request acceptor which accepts a request for modifying registration indicating destination, a via point, and travel time between said destination and said via point by adding information to the registration, editing the registration, or deleting the registration; and a registration modifier which modifies the registration of the destination, the via point, and the travel time between the destination and the via point indicated by said request, by adding information to the registration, editing the registration, or deleting the registration.

10. The local map data server according to claim 8 further comprising:

a user name receiver which receives information representing a user name from said terminal;

an authentication character string generator/transmitter which generates an authentication character string and transmits information representing said generated authentication character string to said terminal;

a password string receiver which receives information representing a password string from said terminal; and a rule memory which stores rules for generating password strings based on the authentication character strings so that the rules are associated with the user names, and said terminal is authenticated when the password string received by said password string receiver is successfully generated based on the authentication character string generated by said authentication character string generator in accordance with the rule corresponding to the user name received by said user name receiver being stored in said rule memory.

11. A travel time obtaining server which is connected to a wide area map data server, a plurality of local map data server, and a terminal via a computer network, comprising:

an enquiry acceptor which accepts an enquiry indicating a nearby point and destination;

a selector which selects a local map data servers on which said destination is registered from said plurality of the local map data servers;

a local map data obtainer which transmits an enquiry indicating said destination to said selected local map data server to obtain information representing a via point and travel time between said via point and said destination;

a wide area map data obtainer which transmits an enquiry indicating said nearby point and said via point to said wide area map data server to obtain information representing travel time between said nearby point and said via point; and a calculator/responder which calculates the sum of said obtained travel time between the nearby point and the via point and the travel time between said via point and said destination, and responds to said enquiry accepted by said enquiry acceptor by transmitting information representing the sum as travel time between said nearby point and said destination to said terminal.

12. A method of controlling a local map data server which is connected to a wide area map data server on which via points are registered and a travel time obtaining server via a computer network, which comprises a local map data register which stores information representing destination, a via point registered on said wide area map data server, travel time between said via point and said destination which are associated with each other, comprising the steps of:

accepting an enquiry indicating destination; and if said destination is registered on said local map data register, responding to said enquiry by transmitting information representing a via point and travel time corresponding to said registered destination.

13. The method of controlling said local map data server according to claim 12 further comprising the steps of:

accepting a connection request from a terminal; and if said terminal which send said connection request is authenticated, establishing connection between said terminal and said computer network.

14. The method of controlling said local map data server according to claim 13 further comprising the steps of accepting a request for modifying registration by adding the information, editing the registration, or deleting the registration with indicating destination, a via point, and travel time between said destination and said via point, from said authenticated terminal; and modifying the registration of said destination, said via point, and travel time between said destination and said via point indicated by said request, by adding information to the registration, editing the registration, or deleting the registration.

15. The method of controlling said local map data server according to claim 13, wherein said local map data server further comprises a rule memory which stores rules for generating a password string based on an authentication character string so that the rules are associated with user names respectively, said method further comprising the steps of receiving information representing the user name from said terminal;

generating the authentication character string, and transmitting information representing said generated authentication character string; and receiving information representing the password string from said terminal, wherein said terminal is authenticated when the password string received at said password string receiving step is successfully generated based on the authentication character string generated by said authentication character string generating step in accordance with the rule corresponding to the user name received by said user name receiving step being stored in said rule memory.

16. A method of controlling a travel time obtaining server which is connected to a wide area map data server, a plurality of local map data servers, and a terminal via a computer network, comprising the steps of:

accepting an enquiry indicating a nearby point and destination from said terminal;

selecting a local map data server on which said destination is registered from said plurality of the local map data servers;

transmitting an enquiry indicating said destination to said selected local map data server to obtain information representing a via point and travel time between said via point and said destination; and responding to said enquiry accepted at said enquiry accepting step by transmitting information representing the sum of said obtained travel time between the nearby point and the via point and travel time between said via point and said destination, to said terminal as information representing travel time between said nearby point and said destination.

17. A computer readable recording medium storing a program which causes a computer which is connected to a wide area map data server on which via points are registered and a travel time obtaining server via a computer network, to function as:

a local map data register which stores information representing destination, a via point registered on said wide area map data server, and travel time between said via point and said destination which are associated with each other, a destination acceptor which accepts an enquiry indicating destination; and an information responder which responds to said accepted enquiry by transmitting information representing a via point and travel time corresponding to said destination if said destination is registered on said local map data server.

18. The recording medium according to claim 17, wherein said program further causes said computer to function as:

a connection request acceptor which accepts a connection request form a terminal, and a connection establisher which establishes connection between said terminal and said computer network if said terminal which sends said connection request is authenticated.

19. The recording medium according to claim 18, wherein said program further causes said computer to function as:

a modification request acceptor which accepts a request for modifying registration by adding information to the registration, editing the registration, or deleting the registration with indicating destination, a via point, and travel time between said destination and said via point from said authenticated terminal; and a registration modifier which modifies the registration of the destination, the via point, and travel time between said destination and said via point indicated by said request, adding information to the registration, editing the registration, or deleting the registration.

20. The recording medium according to claim 18, wherein said program further pauses said computer to function as:

a user name receiver which receives information representing a user name from said terminal;

an authentication character string generator/transmitter which generates an authentication character string and transmits information representing said generated authentication character string to said terminal;

a password string receiver which receives information representing a password string from said terminal; and a rule memory which stores rules for generating a password string based on the authentication character string with associating the rules with the user names respectively, wherein said terminal is authenticated when the password string received by said password string receiving step is successfully generated based on the authentication character string generated by said authentication character string generating step in accordance with the rule corresponding to the user name received by said user name receiving step being stored in said rule memory.

21. A computer readable recording medium storing a program which causes a computer which is connected to a wide area map data server, a plurality of local map data servers, and a terminal via a computer network, to function as:

an enquiry acceptor which accepts an enquiry indicating a nearby point and destination, from said terminal;

a selector which selects a local map data server on which said destination is registered, from said plurality of the local map data servers, a local map data obtainer which transmits an enquiry indicating said destination to said selected local map data server to obtain information representing a via point and travel time between said via point and said destination;

a wide area map data obtainer which transmits an enquiry indicating said nearby point and said via point to obtain information representing travel time between said nearby point and said via point; and a calculator/responder which calculates the sum of said obtain travel time between the nearby point and the via point and the travel time between said via point and said destination, and responds to said enquiry accepted by said enquiry acceptor by transmitting information representing the calculated sum as travel time between said nearby point and said destination to said terminal.

22. The recording medium according to claim 17, wherein said recording medium storing said program is any one of a compact disc, a floppy disk, a hard disk, a magneto-optical disk, a digital versatile disc, a magnetic tape, and a semiconductor memory.

23. The recording medium according to claim 21, wherein said recording medium storing said program is any one of a compact disc, a floppy disk, a hard disk, a magneto-optical disk, a digital versatile disc, a magnetic tape, and a semiconductor memory.

\* \* \* \* \*

UNITED STATES PATENT AND TRADEMARK OFFICE
CERTIFICATE OF CORRECTION

PATENT NO.     : 6,401,031 B2
DATED          : June 4, 2002
INVENTOR(S)    : Hideharu Ogawa It is certified that error appears in the above-identified patent and that said Letters Patent is hereby corrected as shown below:

<u>Title page,</u>
Item [30], Foreign Application Priority Data, from "March 20, 2001" to
-- February 21, 2000 --

Signed and Sealed this

Thirty-first Day of December, 2002

JAMES E. ROGAN
*Director of the United States Patent and Trademark Office*